(12) United States Patent
Belsom et al.

(10) Patent No.: US 9,291,103 B2
(45) Date of Patent: Mar. 22, 2016

(54) FUEL NOZZLE FOR A COMBUSTOR OF A GAS TURBINE ENGINE

(71) Applicant: General Electric Company, Schenectady, NY (US)

(72) Inventors: Keith Cletus Belsom, Laurens, SC (US); Kevin Weston McMahan, Greer, SC (US); Larry Lou Thomas, Flat Rock, NC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 589 days.

(21) Appl. No.: 13/705,443

(22) Filed: Dec. 5, 2012

(65) Prior Publication Data

US 2014/0150434 A1   Jun. 5, 2014

(51) Int. Cl.
*F02C 7/22* (2006.01)
*F23R 3/28* (2006.01)
*F23R 3/32* (2006.01)

(52) U.S. Cl.
CPC ............... *F02C 7/222* (2013.01); *F23R 3/286* (2013.01); *F23R 3/32* (2013.01)

(58) Field of Classification Search
CPC ............ F23R 3/286; F23R 3/283; F23R 3/28; F02C 7/222; F02C 7/22; F23D 11/40; F23D 11/404; F23D 14/00–14/105
See application file for complete search history.

(56) References Cited

U.S. PATENT DOCUMENTS

| | | | | |
|---|---|---|---|---|
| 2,560,401 A * | 7/1951 | Allen | ..................... | F23R 3/32 60/738 |
| 4,100,733 A | 7/1978 | Striebel et al. | | |
| 4,262,482 A * | 4/1981 | Roffe | ..................... | F02C 7/224 431/247 |
| 4,408,461 A * | 10/1983 | Bruhwiler | ................ | F23R 3/32 60/737 |
| 5,104,310 A * | 4/1992 | Saltin | ........................ | F23C 7/00 431/10 |
| 5,235,814 A | 8/1993 | Leonard | | |
| 5,263,325 A * | 11/1993 | McVey | ..................... | F23R 3/34 60/39.826 |
| 5,361,586 A * | 11/1994 | McWhirter | ............ | F23D 14/02 60/737 |
| 5,881,756 A * | 3/1999 | Abbasi | .................... | F23D 14/62 137/599.03 |
| 5,888,059 A * | 3/1999 | Edwards | ............... | B05B 7/0475 239/403 |
| 6,098,407 A * | 8/2000 | Korzendorfer | ......... | F23C 7/002 60/737 |
| 6,282,904 B1 * | 9/2001 | Kraft | ..................... | F23R 3/343 60/39.091 |
| 6,415,608 B1 | 7/2002 | Newburry | | |

(Continued)

OTHER PUBLICATIONS

EP Search Report and Written Opinion dated Jan. 24, 2014, issued in connection with corresponding EP Patent Application No. 13187420.8.

*Primary Examiner* — Phutthiwat Wongwian
*Assistant Examiner* — Rene Ford
(74) *Attorney, Agent, or Firm* — Dority & Manning, PA

(57) ABSTRACT

A fuel nozzle for a gas turbine generally includes a main body having an upstream end axially separated from a downstream end. The main body at least partially defines a fuel supply passage that extends through the upstream end and at least partially through the main body. A fuel distribution manifold is disposed at the downstream end of the main body. The fuel distribution manifold includes a plurality of axially extending passages that extend through the fuel distribution manifold. A plurality of fuel injection ports defines a flow path between the fuel supply passage and each of the plurality of axially extending passages.

12 Claims, 8 Drawing Sheets

(56) References Cited

U.S. PATENT DOCUMENTS

| | | | | |
|---|---|---|---|---|
| 6,446,439 B1* | 9/2002 | Kraft | F23R 3/286 | 60/739 |
| 6,623,267 B1* | 9/2003 | Golladay, Jr. | F23D 14/02 | 239/406 |
| 6,983,600 B1* | 1/2006 | Dinu | F23R 3/40 | 60/39.822 |
| 7,021,562 B2 | 4/2006 | Mansour et al. | | |
| 7,117,677 B2* | 10/2006 | Inoue | F23R 3/10 | 60/737 |
| 8,147,121 B2* | 4/2012 | Lacy | F23R 3/34 | 366/131 |
| 8,539,773 B2* | 9/2013 | Ziminsky | F23R 3/286 | 60/737 |
| 2005/0252217 A1* | 11/2005 | Chen | F23R 3/14 | 60/776 |
| 2008/0268387 A1* | 10/2008 | Saito | F23R 3/286 | 431/8 |
| 2009/0158743 A1* | 6/2009 | Francis | F02C 7/222 | 60/748 |
| 2010/0031662 A1* | 2/2010 | Zuo | F23D 14/78 | 60/740 |
| 2010/0095676 A1* | 4/2010 | Uhm | F23D 11/40 | 60/737 |
| 2010/0139280 A1* | 6/2010 | Lacy | F23D 14/82 | 60/737 |
| 2010/0186413 A1* | 7/2010 | Lacy | F23R 3/10 | 60/740 |
| 2010/0192581 A1 | 8/2010 | Ziminsky et al. | | |
| 2010/0218501 A1* | 9/2010 | York | F23R 3/286 | 60/737 |
| 2010/0252652 A1 | 10/2010 | Johnson et al. | | |
| 2010/0287942 A1 | 11/2010 | Zuo et al. | | |
| 2010/0293955 A1* | 11/2010 | Berry | F23R 3/286 | 60/742 |
| 2011/0073684 A1* | 3/2011 | Johnson | F23D 14/02 | 239/553.5 |
| 2011/0083439 A1* | 4/2011 | Zuo | F23D 14/64 | 60/737 |
| 2011/0113783 A1* | 5/2011 | Boardman | F23C 13/06 | 60/723 |
| 2012/0031097 A1* | 2/2012 | McMahan | F23C 7/004 | 60/738 |
| 2012/0031102 A1 | 2/2012 | Uhm et al. | | |
| 2012/0047900 A1* | 3/2012 | Bottcher | F02C 7/222 | 60/739 |
| 2012/0055167 A1* | 3/2012 | Johnson | F01D 9/023 | 60/776 |
| 2013/0062425 A1* | 3/2013 | Belsom | F23R 3/10 | 239/1 |
| 2013/0074510 A1* | 3/2013 | Berry | F23R 3/36 | 60/772 |
| 2013/0084534 A1* | 4/2013 | Melton | F23R 3/10 | 431/2 |
| 2013/0104556 A1* | 5/2013 | Uhm | F23L 7/005 | 60/772 |
| 2013/0115561 A1* | 5/2013 | Melton | F23R 3/286 | 431/8 |
| 2014/0013756 A1* | 1/2014 | Melton | F02C 7/22 | 60/725 |

\* cited by examiner

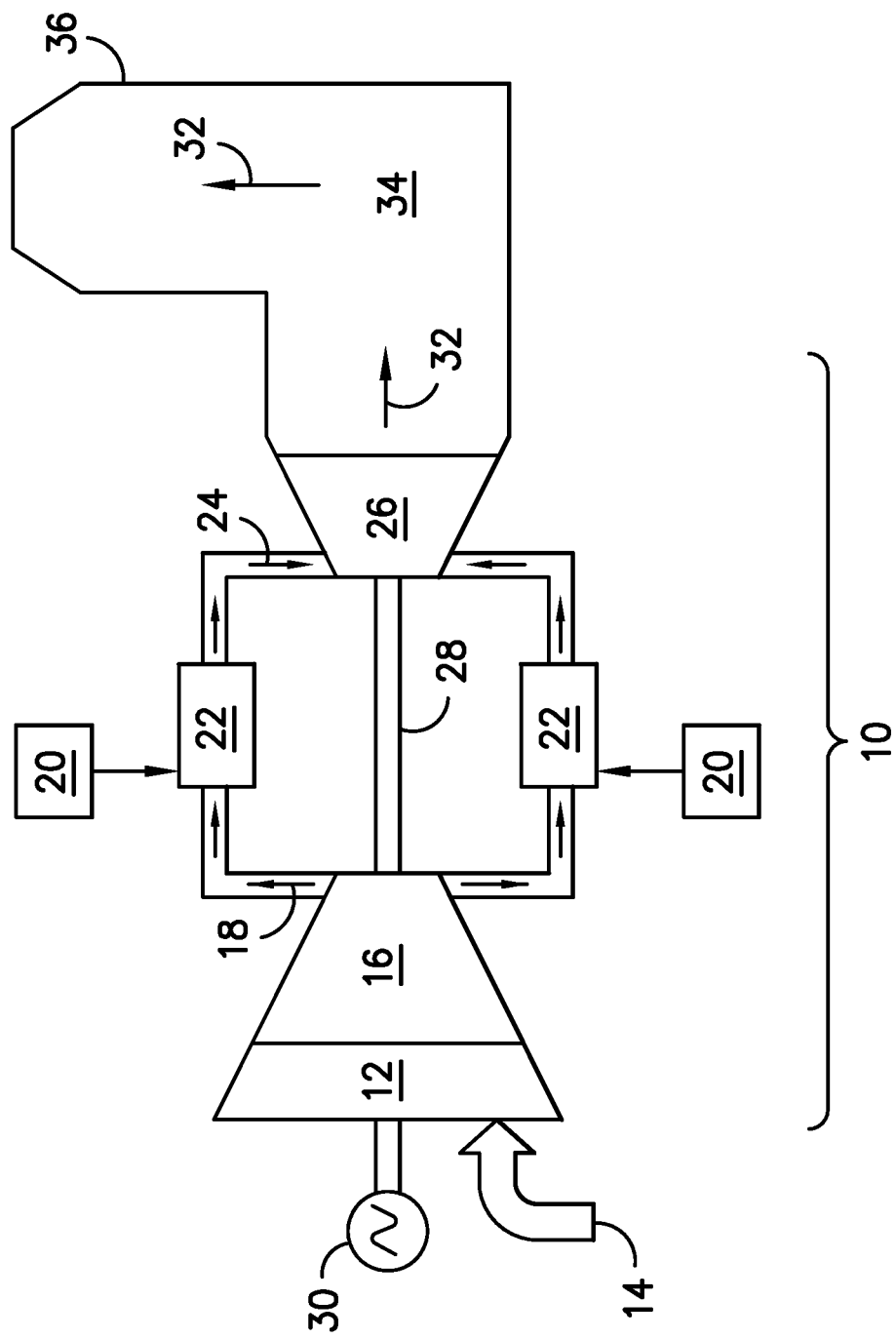
FIG. -1-
PRIOR ART

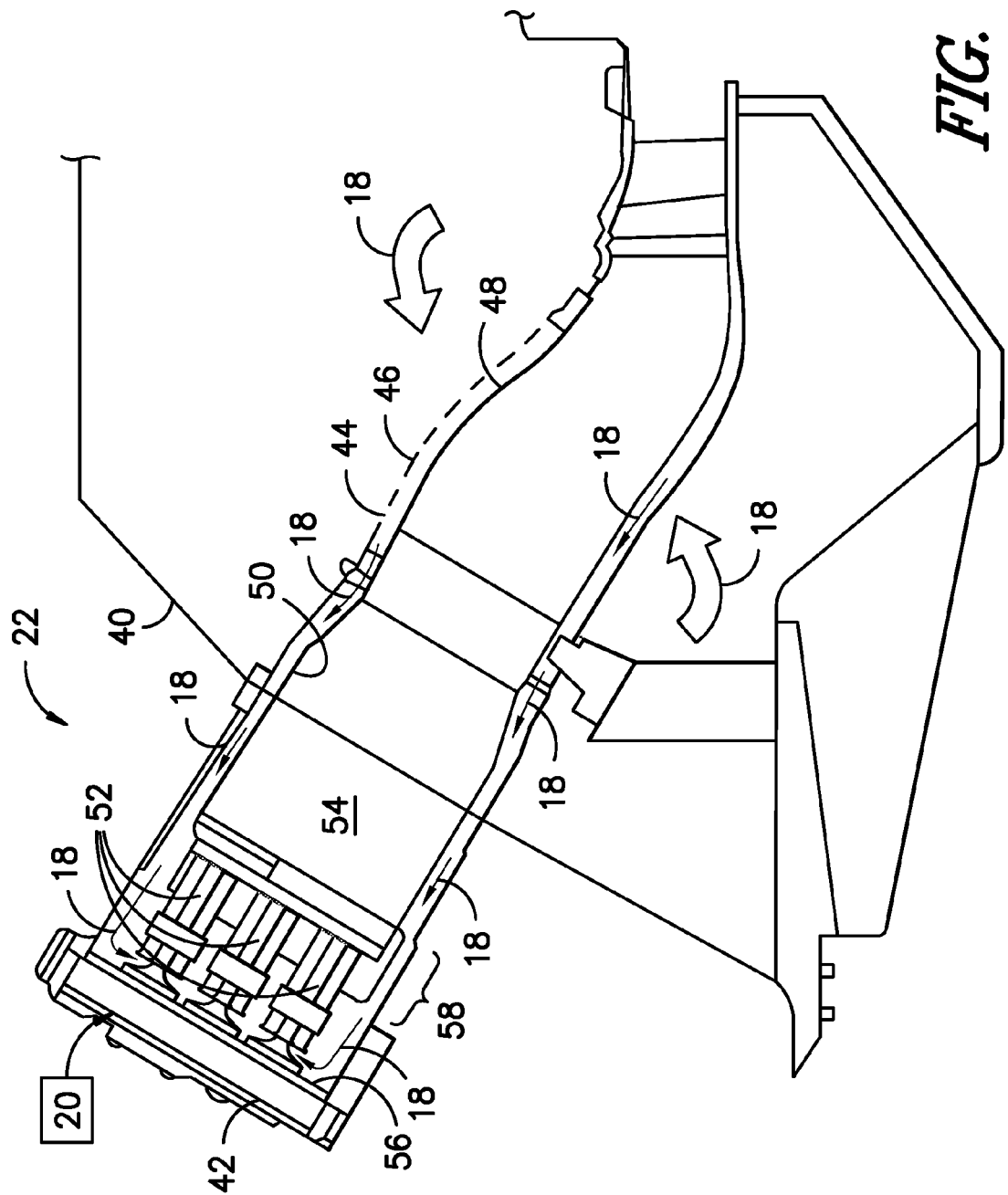
FIG. -2-

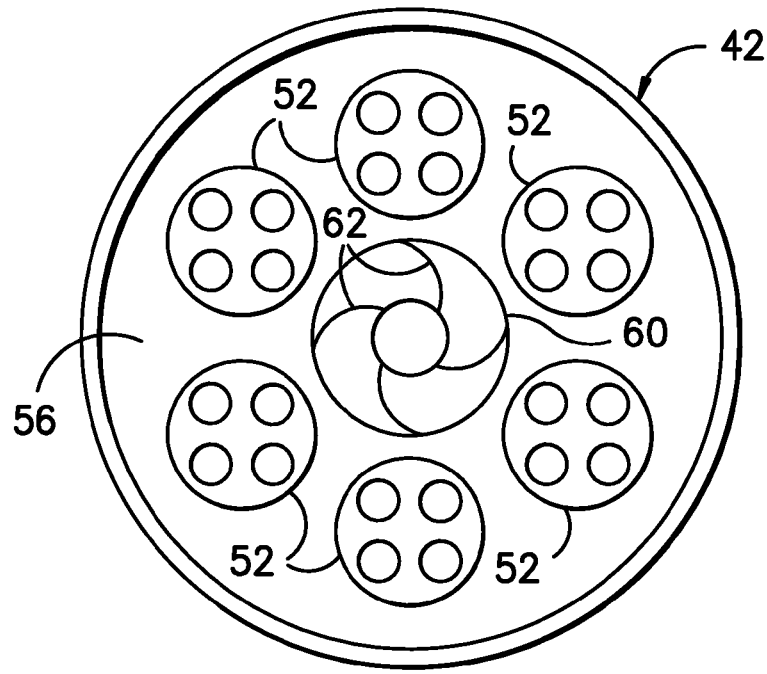
FIG. -3-
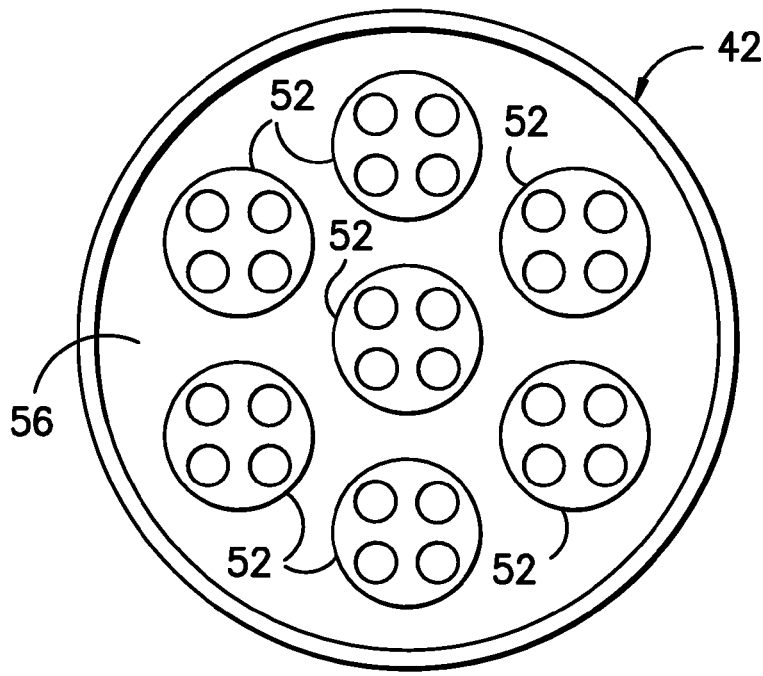
FIG. -4-

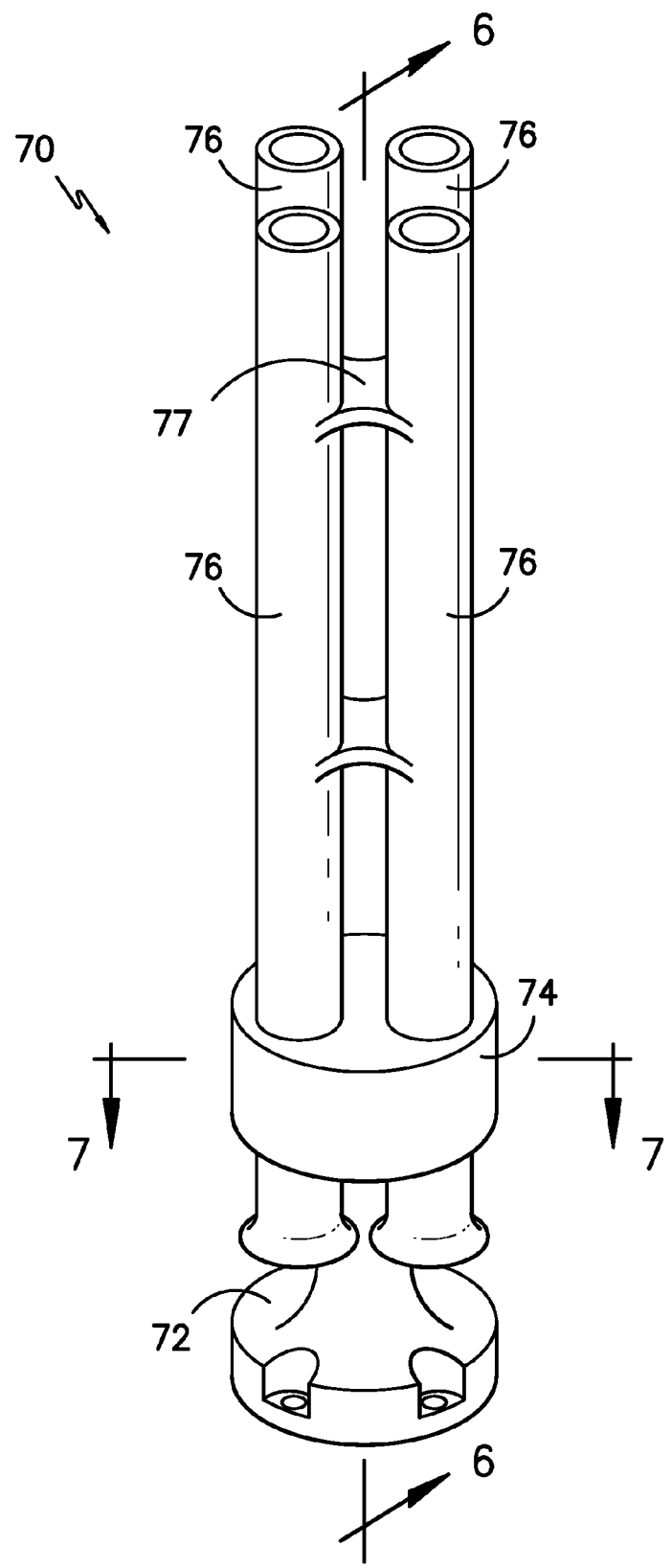
FIG. -5-

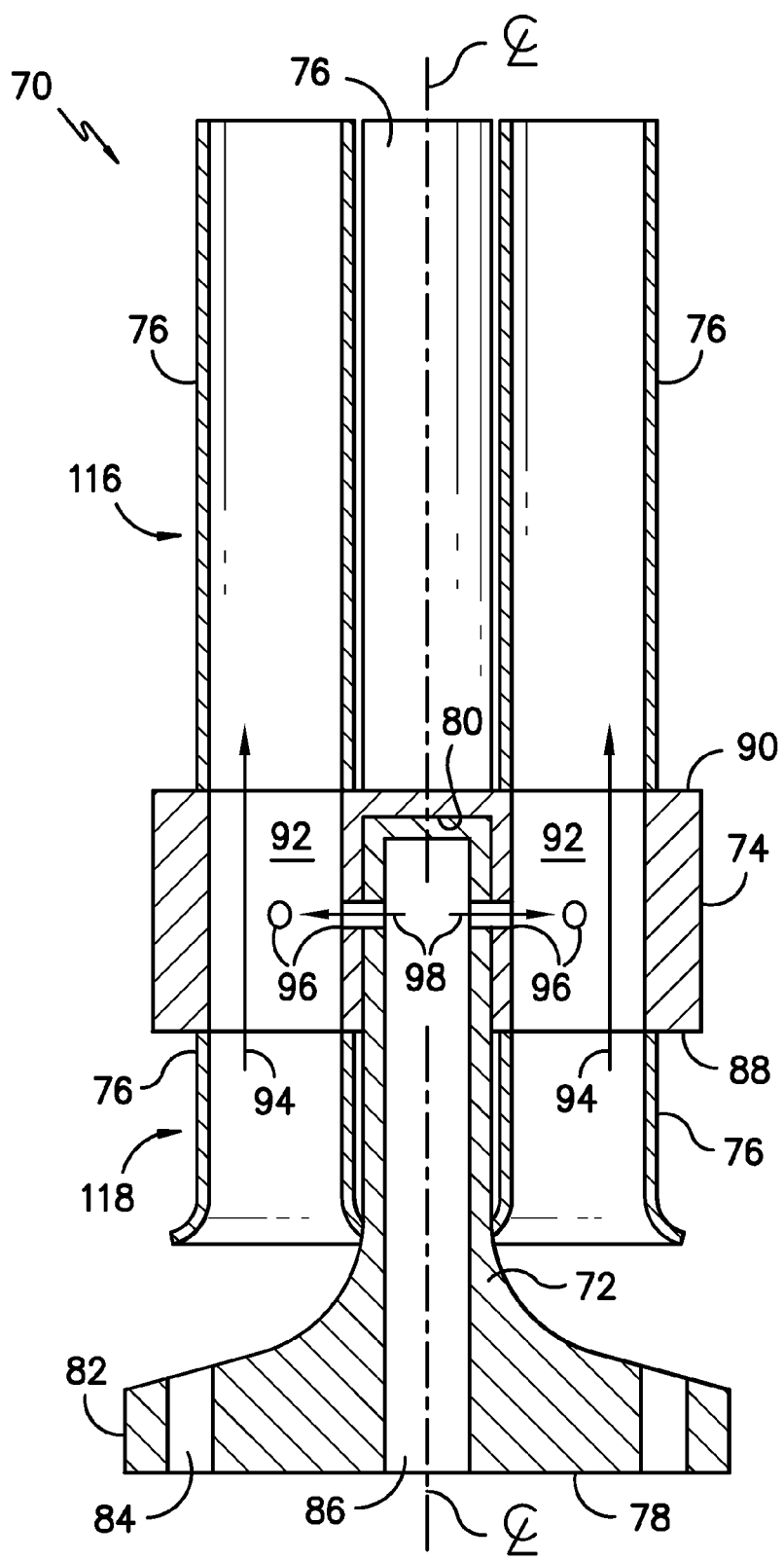
FIG. -6-

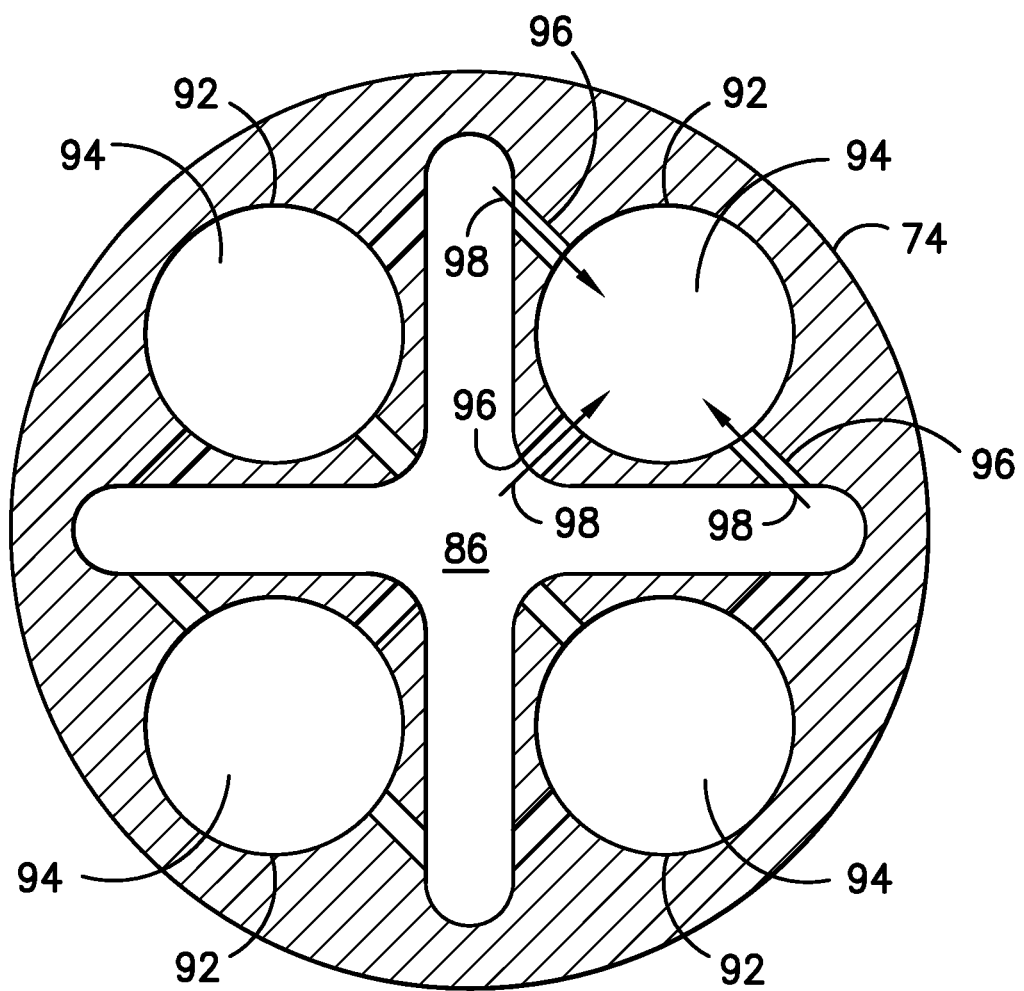
FIG. —7—

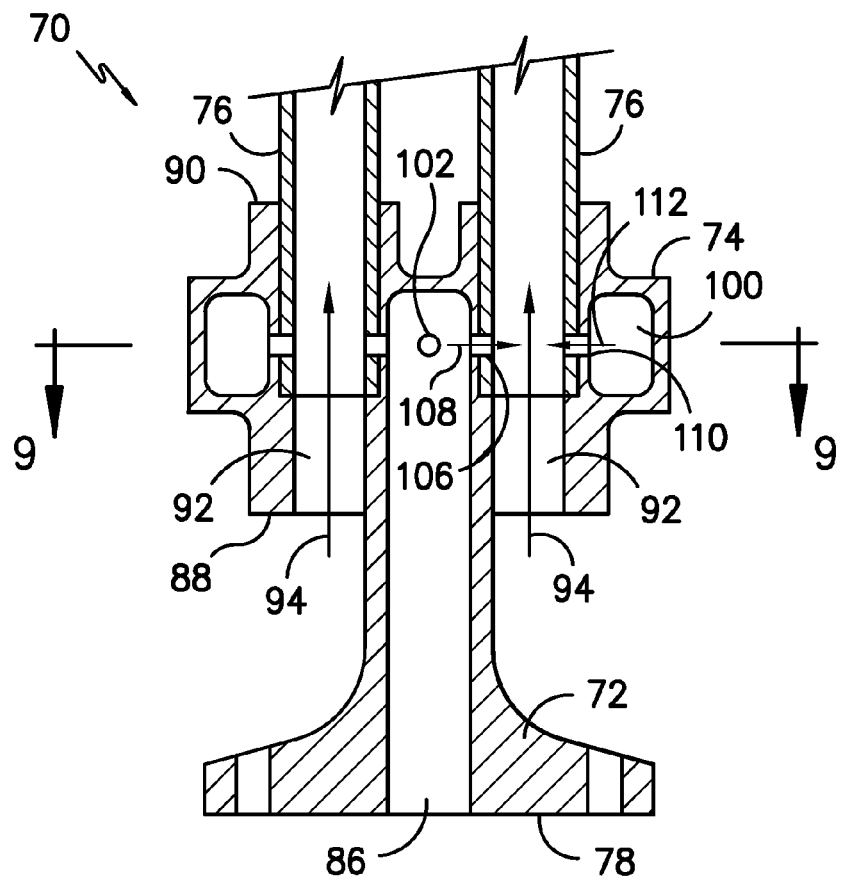
FIG. -8-
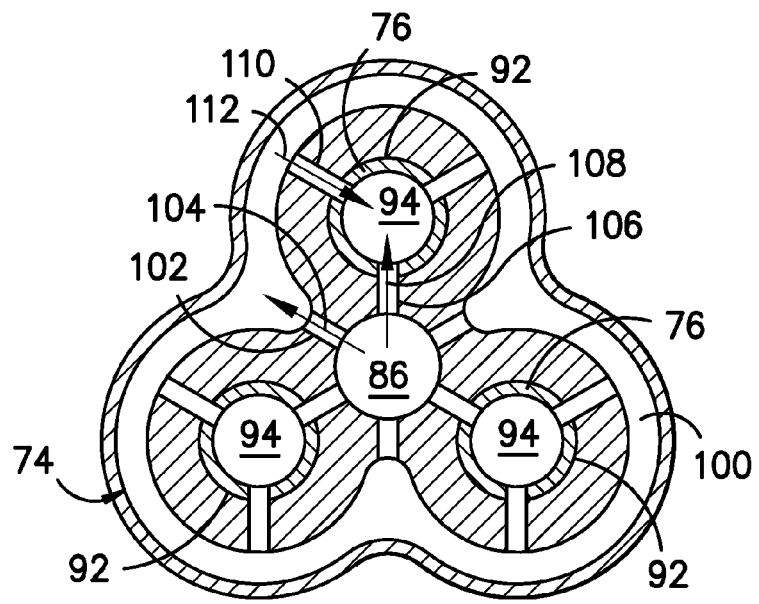
FIG. -9-

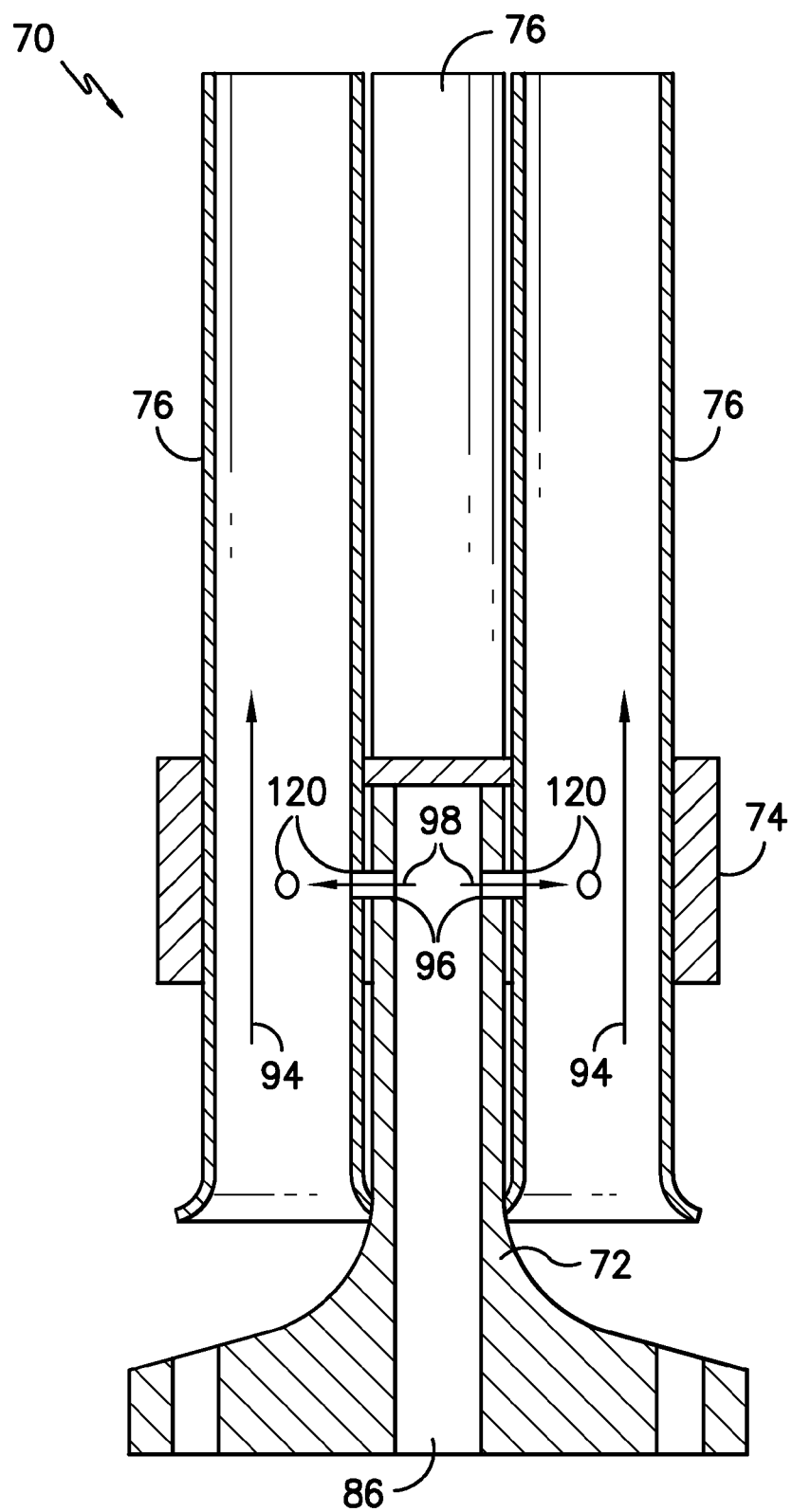
FIG. -10-

FUEL NOZZLE FOR A COMBUSTOR OF A GAS TURBINE ENGINE

FEDERAL RESEARCH STATEMENT

This invention was made with Government support under Contract No. DE-FC26-05NT42643, awarded by the Department of Energy. The Government has certain rights in the invention.

FIELD OF THE INVENTION

The present invention generally relates to a combustor of a gas turbine. More particularly, this invention relates to a fuel nozzle assembly for the combustor of the gas turbine.

BACKGROUND OF THE INVENTION

Combustors are commonly used in industrial and power generation operations to ignite fuel to produce combustion gases having a high temperature and pressure. For example, turbo-machines such as gas turbines typically include one or more combustors to generate power or thrust. A typical gas turbine includes an inlet section, a compressor section, a combustion section, a turbine section, and an exhaust section. The inlet section cleans and conditions a working fluid (e.g., air) and supplies the working fluid to the compressor section. The compressor section increases the pressure of the working fluid and supplies a compressed working fluid to the combustion section. The compressed working fluid and a fuel are mixed within the combustion section and burned to generate combustion gases having a high temperature and pressure. The combustion gases flow to the turbine section where they expand to produce work. For example, expansion of the combustion gases in the turbine section may rotate a shaft connected to a generator to produce electricity.

The combustion section may include one or more combustors annularly arranged between the compressor section and the turbine section. Various parameters influence the design and operation of the combustors. For example, higher combustion gas temperatures generally improve the thermodynamic efficiency of the combustor. However, higher combustion gas temperatures also promote flame holding conditions in which the combustion flame migrates towards a downstream end of the fuel nozzles, possibly causing accelerated damage to the nozzles in a relatively short amount of time. In addition, higher combustion gas temperatures generally increase the disassociation rate of diatomic nitrogen, increasing the production of nitrogen oxides ($NO_X$). Conversely, a lower combustion gas temperature associated with reduced fuel flow and/or part load operation (turndown) generally reduces the chemical reaction rates of the combustion gases, increasing the production of carbon monoxide and unburned hydrocarbons.

In a particular combustor design, the combustor includes a cap assembly that extends radially across at least a portion of the combustor. A plurality of tubes is radially arranged in one or more tube bundles across the cap assembly to define a flow path for the compressed working fluid to flow through the cap assembly and into a combustion chamber. Fuel supplied to a fuel plenum inside the cap assembly may flow into the tubes through one or more fuel injection ports that extend radially through each or some of the tubes. The fuel and compressed working fluid mix inside the tubes before flowing out of the tubes and into the combustion chamber.

Although effective at enabling higher operating temperatures while protecting against flame holding and controlling undesirable emissions, the tube bundles present several manufacturing challenges due to the number of individual components required to form the fuel nozzle assembly and the overall complexity of the design. As a result, the complexity of the design generally corresponds to additional costs to manufacture the tube bundles. Therefore, an improved fuel nozzle that is less complex and/or less expensive to manufacture than current designs while promoting flame stability, and/or while reducing undesirable emissions over a wide range of combustor operating levels would be useful to the gas turbine industry.

BRIEF DESCRIPTION OF THE INVENTION

Aspects and advantages of the invention are set forth below in the following description, or may be obvious from the description, or may be learned through practice of the invention.

One embodiment of the present invention is a fuel nozzle for a gas turbine. The fuel nozzle includes a main body having an upstream end axially separated from a downstream end. The main body at least partially defines a fuel supply passage that extends through the upstream end and at least partially through the main body. A fuel distribution manifold is disposed at the downstream end of the main body. The fuel distribution manifold includes a plurality of axially extending passages that extend through the fuel distribution manifold. At least one fuel injection port defines a flow path between the fuel supply passage and a respective one of the plurality of axially extending passages.

Another embodiment of the present invention is a fuel nozzle for a gas turbine. The fuel nozzle generally includes a main body having an upstream end and a downstream end. The main body at least partially defines a fuel supply passage that extends through the upstream end and at least partially through the main body. A fuel distribution manifold extends radially outward from the downstream end of the main body. The fuel distribution manifold defines a plurality of axially extending passages arranged in an annular array around the downstream end of the main body. The fuel distribution manifold further defines a fuel plenum that at least partially surrounds each of the plurality of axially extending passages. A flow path is defined between the fuel supply passage of the main body and the fuel plenum of the fuel distribution manifold. At least one fuel injection port defines a flow path between the fuel plenum of the fuel distribution manifold and a respective one of the axially extending passages.

Another embodiment of the present invention includes a gas turbine. The gas turbine includes a compressor, a combustor downstream from the compressor and a turbine downstream from the combustor. The combustor includes an end cover connected to a casing that at least partially surrounds the combustor. The end cover includes an inner surface. A plurality of fuel nozzles extends downstream from the inner surface of the end cover. Each fuel nozzle comprises of a main body having an upstream end and a downstream end. The main body at least partially defines a fuel supply passage that extends through the upstream end and at least partially through the main body. A fuel distribution manifold extends radially outward from the downstream end of the main body. The fuel distribution manifold at least partially defines a plurality of axially extending passages arranged in an annular array around the downstream end of the main body. At least one flow path is defined between the fuel supply passage of the main body and a respective one of the plurality of axially extending passages of the fuel distribution manifold.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which:

FIG. 1 is a functional block diagram of an exemplary gas turbine within the scope of the present invention;

FIG. 2 is a simplified cross-section side view of an exemplary combustor according to various embodiments of the present invention;

FIG. 3 is a top view of a portion of the combustor as shown in FIG. 2, according to at least one embodiment of the present invention;

FIG. 4 is a top view of a portion of the combustor as shown in FIG. 2, according to at least one embodiment of the present invention;

FIG. 5 is a perspective view of a fuel nozzle according to at least one embodiment of the invention;

FIG. 6 is a cross section side view of the fuel nozzle shown in FIG. 5 taken along line 6-6;

FIG. 7 is a cross section top view of a portion of the fuel nozzle shown in FIG. 5 taken along line 7-7;

FIG. 8 is a cross section side view of a fuel nozzle according to at least one embodiment of the invention;

FIG. 9 is a cross section top view of the fuel nozzle shown in FIG. 8 taken along line 9-9; and FIG. 10 is a cross section side view of the fuel nozzle shown in FIG. 5 according to at least one embodiment of the present invention.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "upstream," "downstream," "radially," and "axially" refer to the relative direction with respect to fluid flow in a fluid pathway. For example, "upstream" refers to the direction from which the fluid flows, and "downstream" refers to the direction to which the fluid flows. Similarly, "radially" refers to the relative direction substantially perpendicular to the fluid flow, and "axially" refers to the relative direction substantially parallel to the fluid flow.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a combustor having a plurality of fuel nozzles where each fuel nozzle includes a plurality of tubes and a fuel distribution manifold. In general, each fuel nozzle assembly includes a main body that extends axially downstream from an end cover of the combustor. The main body defines a fuel supply passage that extends at least partially through the main body. The fuel supply passage is in fluid communication with a fuel supply through the end cover of the combustor.

A fuel distribution manifold is disposed at a downstream end of the main body and is in fluid communication with the fuel passage. A plurality of axially extending passages extends through the fuel distribution manifold. The plurality of axially extending passages is arranged in an annular array around a downstream portion of the main body. Each of the axially extending passages is in fluid communication with the fuel supply passage. Each of the axially extending passages is aligned with a corresponding tube that extends generally axially upstream and/or downstream from the fuel distribution manifold. Each tube and its corresponding axially extending passage at least partially define a premix flow path through the fuel nozzle. In a particular embodiment, a compressed working fluid enters each tube upstream from the fuel distribution manifold. Fuel is routed through the end cover and into the fuel supply passage of the main body. The fuel is injected from the fuel supply passage generally radially into each axially extending passage. The fuel and the compressed working fluid mix within each premix flow path to form a premixed combustible mixer.

The premixed combustible mixture continues to mix as it flows through the tubes and into a combustion zone of the combustor where it is burned to produce a hot gas. In certain embodiments, the main body and the fuel distribution manifold may be cast or otherwise formed as a singular component. In further embodiments, the tubes may be cast or otherwise formed as a singular component with the fuel distribution manifold or with both the fuel distribution manifold and the main body of the fuel nozzle. As a result, the fuel nozzle comprises of fewer individual components, thus reducing manufacturing time and costs while maintaining adequate design margins of flame holding and emissions performance. Although exemplary embodiments of the present invention will be described generally in the context of a combustor incorporated into a gas turbine for purposes of illustration, one of ordinary skill in the art will readily appreciate that embodiments of the present invention may be applied to any combustor incorporated into any turbo-machine and are not limited to a gas turbine combustor unless specifically recited in the claims.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18 at a highly energized state.

The compressed working fluid 18 is mixed with a fuel from a fuel supply system 20 to form a combustible mixture within one or more combustors 22. The combustible mixture is burned to produce combustion gases 24 having a high temperature and pressure. The combustion gases 24 flow through a turbine 26 of a turbine section to produce work. For example, the turbine 26 may be connected to a shaft 28 so that rotation of the turbine 26 drives the compressor 16 to produce the compressed working fluid 18. Alternately or in addition, the shaft 28 may connect the turbine 26 to a generator 30 for producing electricity. Exhaust gases 32 from the turbine 26 flow through an exhaust section 34 that connects the turbine 26 to an exhaust stack 36 downstream from the turbine 26. The exhaust section 34 may include, for example, a heat recovery steam generator (not shown) for cleaning and extracting additional heat from the exhaust gases 32 prior to release to the environment.

The combustors 22 may be any type of combustor known in the art, and the present invention is not limited to any particular combustor design unless specifically recited in the claims. FIG. 2 provides a simplified cross-section side view of an exemplary combustor 22 that incorporates various embodiments of the present invention. As shown in FIG. 2, a casing 40 and an end cover 42 may combine to contain the compressed working fluid 18 flowing to the combustor 22. The compressed working fluid 18 may pass through flow holes 44 in an impingement sleeve 46 or flow sleeve to flow along the outside of a transition duct 48 and/or a liner 50 towards the end cover 42 to provide convective cooling to the transition duct 48 and/or the liner 50. At the end cover 42, the compressed working fluid 18 reverses in direction and flows through a plurality of fuel nozzles 52. The fuel flows from the fuel supply system 20 through one or more fuel circuits (not shown) defined within the end cover 42 and into each or some of the fuel nozzles 52. The compressed working fluid 18 is mixed with the fuel as it passes through each of the plurality of fuel nozzles 52 to form the combustible mixture. The combustible mixture flows from each of the fuel nozzles 52 and into a combustion chamber 54 that is defined within the combustor downstream from the fuel nozzles 52 for combustion. Each of the fuel nozzles 52 extends downstream from an inner surface 56 of the end cover 42. In particular embodiments, each of the plurality of fuel nozzles 52 extends at least partially through a cap assembly 58 that extends radially and circumferentially within the combustor 22.

FIGS. 3 and 4 provide an upstream view of the end cover 42 including the plurality of fuel nozzles 52 according to various embodiments of the present disclosure. As shown in FIG. 3, the plurality of fuel nozzles 52 may be arranged in an annular array around a center fuel nozzle 60 such as a diffusion and/or swozzle type fuel nozzle. The center fuel nozzle 60 may include a plurality of swirler vanes 62 configured to swirl the compressed working as it flows through the center fuel nozzle 60 and into the combustion chamber 54 (FIG. 2). As shown in FIG. 4, the plurality of the fuel nozzles 52 may be disposed radially across the end cover 42 without a diffuser or swozzle type fuel nozzle. Although shown in a generally annular pattern, it should be appreciated by one of ordinary skill in the art that the plurality of fuel nozzles 52 may be disposed about the inner surface of the end cover 42 in any pattern and in any quantity suitable for a particular combustor design. For example, the fuel nozzles 52 may be arranged in a triangular pattern, rectangular pattern or semi-circular pattern. The fuel nozzles 52 may be bundled or clustered and/or may be distributed evenly across the inner surface 56 of the end cover.

FIG. 5 provides a perspective view of a representative fuel nozzle 70 of the plurality of fuel nozzles 52 as shown in FIGS. 2, 3 and 4, according to at least one embodiment of the present disclosure. FIG. 6 illustrates a cross section side view of the fuel nozzle 70 shown in FIG. 5, according to various embodiments and FIG. 7 illustrates a cross section top view of a portion of the fuel nozzle 70 as shown in FIG. 5. As shown in FIG. 5, the fuel nozzle 70 generally includes a main body 72, a fuel distribution manifold 74 disposed at one end of the main body 72, and a plurality of tubes 76 that extend upstream and/or downstream from the fuel distribution manifold 74. A support feature 77 such as a bridge may extend between each or some of the tubes 76 to provide structural support to the tubes 76 downstream from the fuel distribution manifold 74. Although generally illustrated as cylindrical tubes in each embodiment, the cross-section of the tubes 76 may be any geometric shape, and the present invention is not limited to any particular cross-section unless specifically recited in the claims.

As shown in FIG. 6, the main body 72 includes an upstream end 78 axially separated from a downstream end 80 with respect to an axial centerline of the main body 72. A flange 82 or other mounting feature is disposed at the upstream end of the main body 72. The flange 82 is configured to allow for connection of the fuel nozzle 70 to the end cover 42 (FIG. 2). For example, the flange 82 may include one or more axially extending bolt holes 84 for connecting the fuel nozzle 70 to the end cover 42 (FIG. 2) using one or more bolts or other mechanical fittings (not shown). As shown in FIG. 6, a fuel supply passage 86 extends through the downstream end 78 of the main body 72 and at least partially through the main body 72. The fuel supply passage 86 may be at least partially defined by the main body 72. For example, the fuel supply passage 86 may be cast in and/or machined out of the main body 72 of the fuel nozzle 70.

As shown in FIG. 6, the fuel distribution manifold 74 extends radially outward from the downstream end 80 of the main body 72 with respect to the axial centerline of the main body 72. The fuel distribution manifold 74 and the main body 72 may be cast as a singular component or joined through any mechanical method known in the art such as by brazing or welding. As shown in FIGS. 6 and 7, the fuel distribution manifold 74 extends circumferentially around at least a portion of the fuel supply passage 86 of the main body 72. As shown in FIG. 6, the fuel distribution manifold 74 includes an upstream end 88 axially separated from a downstream end 90 with respect to the axial center line of the main body 72.

As shown in FIG. 6, a plurality of axially extending passages 92 extend through the fuel distribution manifold 74 between the upstream end 88 and the downstream end 90. As shown in FIGS. 6 and 7, the plurality of axially extending passages 92 is generally arranged in an annular array around a portion of the main body 72. The axially extending passages 92 may be cast and/or machined from a singular piece of material that forms the fuel distribution manifold 74 or that forms both the main body 72 and the fuel distribution manifold 74. Although four axially extending passages 92 are illustrated, it should be understood that the fuel distribution manifold 74 may include as few as two of the axially extending passages 92. In addition, although generally illustrated as cylindrical passages in each embodiment, the cross-section of the axially extending passages 92 may be any geometric shape, and the present invention is not limited to any particular cross-section unless specifically recited in the claims.

In particular embodiments, as shown in FIGS. 6 and 7, each axially extending passage 92 at least partially defines a premix flow path 94 that extends generally axially through the fuel distribution manifold 74 with respect to the axial centerline of the main body 72. Each of the plurality of axially extending passages 92 includes at least one fuel injection port 96. Each fuel injection port 96 at least partially defines a flow path 98 that extends between the fuel supply passage 86 and a respective one of the premix flow paths 94.

In alternate embodiments, as shown in FIGS. 8 and 9, the fuel distribution manifold 74 further defines a fuel plenum 100 that at least partially surrounds each axially extending flow passage 92. As shown in FIG. 9, at least one fuel port 102 defines a flow path 104 between the fuel supply passage 86 and the fuel plenum 100. In particular embodiments, at least one fuel injection port 106 defines a flow path 108 between the fuel supply passage 86 and a respective one of the axially extending passages 92 and/or a respective one of the plurality of premix flow paths 94. In addition or in the alternative, at least one fuel injection port 110 defines a flow path 112 between the fuel plenum 100 and a respective one of the axially extending passages 92 and/or a respective one of the plurality of premix flow paths 94.

In particular embodiments, as shown in FIG. 6, each tube 76 of the plurality of tubes 76 is aligned with a respective one of the axially extending passages 92 of the main body 72 so as to further define a respective one of the plurality of premix flow passages 94. In certain embodiments, the fuel nozzle 70 includes a first set 116 of the tubes 76 that extend generally axially downstream from the downstream end 90 of the fuel distribution manifold 74. In addition or in the alternative, the fuel nozzle 70 may include a second set 118 of the tubes 76 that extend generally axially upstream from the upstream end 88 of the fuel distribution manifold 74. As shown, each or some of the second set 118 of the tubes 76 may be flared outward at one end to route the working fluid into the tubes 76 and/or into a respective premix flow passage 94. The first and/or the second set 116, 118 of the tubes 76 may be joined to the fuel distribution manifold 74 in any manner suitable for the operating environment of the combustor 22. For example the tubes 76 may be welded or brazed to the fuel distribution manifold 74. In alternate embodiments, the plurality of tubes 76 may be cast as part of the fuel distribution manifold 74 and/or as part of the main body 72.

In further embodiments, as shown in FIGS. 8 and 10, each of the plurality of tubes 76 extends at least partially through a respective one of the axially extending passages 92. In particular embodiments, as shown in FIG. 10, each of the tubes 76 extends from a point upstream of the upstream end 88 of the fuel distribution manifold 74 to a point downstream of the downstream end 90 of the fuel distribution manifold 74, thereby defining the premix flow passage 94 through the fuel distribution manifold 74. In other embodiments, as shown in FIG. 8, each of the tubes 76 may be seated within a respective one of the axially extending passages 92. The tubes 76 may be joined to the fuel distribution manifold 74 in any manner suitable for the operating environment of the combustor 22. For example the tubes 76 may be welded or brazed to the fuel distribution manifold 74. In particular embodiments, the tubes 76 are cast or otherwise formed as a singular component with the fuel distribution manifold 74 or with both the fuel distribution manifold 74 and the main body 72 of the fuel nozzle 70. In particular embodiments, as shown in FIGS. 8, 9 and 10, the fuel injection ports 106, 110, 96 and the respective flow paths 108, 112, 98 extend through the tubes 76, thereby providing for fluid communication between the fuel supply passage 86 and the respective premix flow passage 94.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. A fuel nozzle for a gas turbine, comprising:
   a. a main body, the main body having an upstream end axially separated from a downstream end, the upstream end including a flange formed to mount to an end cover of a combustor, the main body at least partially defining a fuel supply passage that extends through the upstream end and at least partially through the main body;
   b. a fuel distribution manifold disposed at the downstream end of the main body, the fuel distribution manifold having a plurality of axially extending passages that extend through the fuel distribution manifold;
   c. a plurality of axially extending tubes, each tube coaxially aligned with and extending axially downstream from a respective one of the plurality of axially extending passages, each tube having a respective upstream end seated within the fuel distribution manifold and axially offset from an upstream end of the fuel distribution manifold; and
   d. a first plurality of fuel injection ports, each fuel injection port of the first plurality of fuel injection ports defining a flow path between the fuel supply passage and a respective one of the plurality of axially extending passages.

2. The fuel nozzle as in claim 1, wherein each fuel port of the first plurality of fuel injection ports extends through a respective one of the plurality of axially extending tubes.

3. The fuel nozzle as in claim 1, wherein the fuel distribution manifold and the main body are cast as a singular component.

4. The fuel nozzle as in claim 1, wherein the fuel distribution manifold further includes a fuel plenum that at least partially surrounds the plurality of axially extending passages.

5. The fuel nozzle as in claim 4, wherein the fuel plenum is in fluid communication with the fuel supply passage of the main body.

6. The fuel nozzle as in claim 5, further comprising a second plurality of fuel injection ports, each fuel injection port of the second plurality of fuel ports defining a flow path between the fuel plenum and a respective one of the axially extending passages.

7. A fuel nozzle for a gas turbine, comprising:
   a. a main body having an upstream end and a downstream end, the upstream end including a flange formed to mount to an end cover of a combustor, the main body defining a fuel supply passage that extends through the upstream end and at least partially through the main body;
   b. a fuel distribution manifold that extends radially outward from the downstream end of the main body, the fuel distribution manifold defining a plurality of axially extending passages arranged in an annular array around the downstream end of the main body, the fuel distribution manifold further defining a fuel plenum that at least partially surrounds each of the plurality of axially extending passages;
   c. a flow path defined between the fuel supply passage of the main body and the fuel plenum of the fuel distribution manifold;
   d. a plurality of axially extending tubes, each tube coaxially aligned with and extending axially downstream from a respective one of the plurality of axially extending passages, each tube having a respective upstream end seated within the fuel distribution manifold and axially offset from an upstream end of the fuel distribution manifold; and e. a first plurality of fuel injection ports, each fuel injection port of the first plurality of fuel injection ports defining a flow path between the fuel plenum of the fuel distribution manifold and a respective one of the axially extending passages.

8. The fuel nozzle as in claim 7, wherein the fuel distribution manifold and the main body are cast as a singular component.

9. The fuel nozzle as in claim 7, further comprising a second plurality of fuel injection ports, each fuel injection port of the second plurality of fuel injection ports defining a flow path between the fuel supply passage of the main body and a respective one of the plurality of axially extending passages.

10. A gas turbine, comprising:
a. a compressor, a combustor downstream from the compressor and a turbine downstream from the combustor, the combustor having an end cover connected to a compressor discharge casing that at least partially surrounds the combustor, the end cover having an inner surface;
b. a plurality of fuel nozzles, each fuel nozzle extending downstream from the inner surface of the end cover, each fuel nozzle comprising:
  i. a main body having an upstream end and a downstream end, the upstream end including a flange formed to mount to an end cover of a combustor, the main body defining a fuel supply passage that extends through the upstream end and at least partially through the main body;
  ii. a fuel distribution manifold that extends radially outward from the downstream end of the main body, the fuel distribution manifold defining a plurality of axially extending passages arranged in an annular array around the downstream end of the main body;
  iii. a plurality of axially extending tubes, each tube coaxially aligned with and extending axially downstream from a respective one of the plurality of axially extending passages, each tube having a respective upstream end seated within the fuel distribution manifold, and axially offset from an upstream end of the fuel distribution manifold; and
  iv. at least one flow path defined between the fuel supply passage of the main body and a respective one of the plurality of axially extending passages of the fuel distribution manifold.

11. The gas turbine as in claim 10, wherein the fuel distribution manifold further defines a fuel plenum that circumferentially surrounds the plurality of axially extending passages, the fuel plenum being in fluid communication with the fuel supply passage of the main body.

12. The gas turbine as in claim 11, further comprising at least one fuel flow path defined between the fuel plenum and a respective one of the plurality of axially extending passages.

* * * * *